J. C. BARKER.
DIVISIBLE WHEEL RIM.
APPLICATION FILED MAY 13, 1918.
1,306,515.
Patented June 10, 1919.
2 SHEETS—SHEET 1.
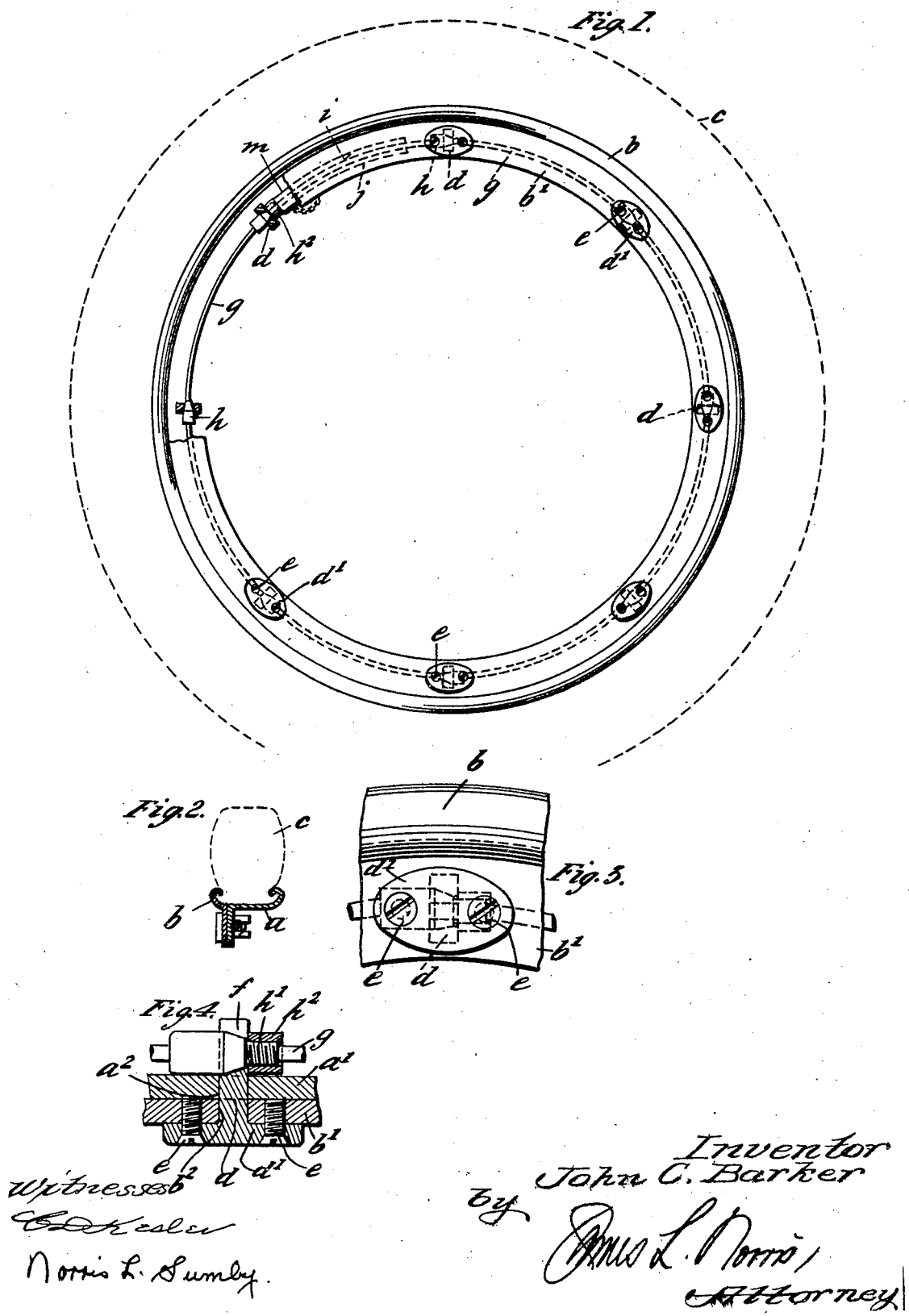
Inventor
John C. Barker
by
James L. Norris,
Attorney
Witnesses
C. D. Kesler
Norris L. Sumby.

J. C. BARKER.
DIVISIBLE WHEEL RIM.
APPLICATION FILED MAY 13, 1918.
1,306,515.
Patented June 10, 1919.
2 SHEETS—SHEET 2.
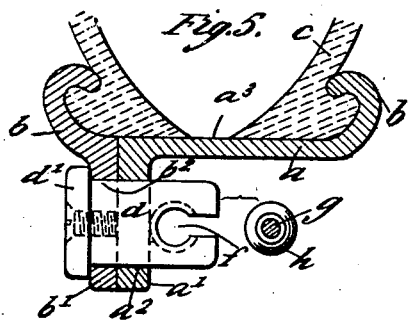
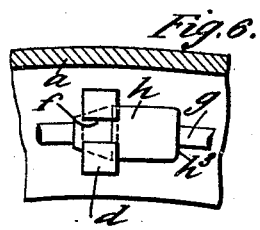
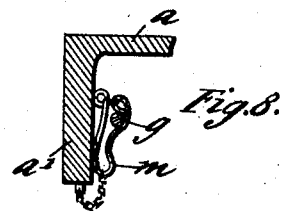
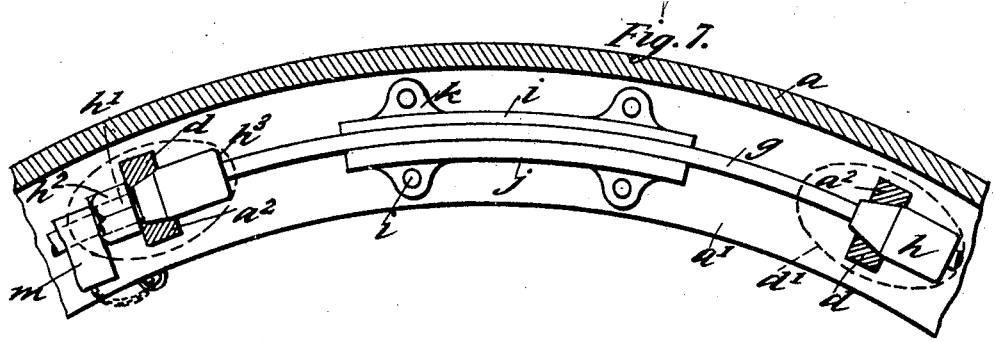
Witnesses:
Inventor
John C. Barker
by
James L. Norris,
Attorney

UNITED STATES PATENT OFFICE.

JOHN CHARLES BARKER, OF LONDON, ENGLAND.

DIVISIBLE WHEEL-RIM.

1,306,515.  Specification of Letters Patent.  Patented June 10, 1919.

Application filed May 13, 1918. Serial No. 234,252.

*To all whom it may concern:*

Be it known that I, JOHN CHARLES BARKER, a subject of the King of Great Britain, residing in London, England, have invented certain new and useful Improvements in or Relating to Divisible Wheel-Rims, of which the following is a specification.

My invention relates to divisible wheel-rims of the kind comprising in combination a main member that has a radially directed flange and is attached to the spokes, either directly or by means of a felly, and a secondary member that has a similar flange and itself constitutes a retaining flange for a pneumatic or other elastic tire, the secondary member being capable of being detachably connected to or removed from the main member without the necessity of any relative side movement between the said two members coupling parts, having the form of pins or studs which are carried by the radially directed flange of one of the members and are adapted to pass transversely and project through holes or slots provided in the flange of the other member, and a turnable ring circumferentially shiftable relatively to one of the flange faces so as to move into or out of engagement with the projecting ends of the coupling pins or studs, thereby locking or unlocking, according to the direction of turning, all the said coupling parts collectively at one and the same time.

My invention consists in improvements in respect to the construction and arrangement of the members for attaching the rim parts together and of the locking means.

I will describe my invention with reference to the accompanying drawing, in which Figure 1 is a side view of a wheel rim of the type referred to and embodying my invention, some parts being broken away and others in section; Fig. 2 is a cross section of the wheel rim in Fig. 1; Fig. 3 is an elevation, to an enlarged scale, of a portion of the secondary or detachable rim parts; Figs. 4, 5, 6 and 7 are sectional detail views to the enlarged scale, of portions of the rim; and Fig. 8 is a part section of the rim showing an end view of a spring locking clip.

In carrying out my invention in practice, I provide the main rim part $a$ and secondary rim part $b$ which carry a tire $c$, Figs. 2 and 5, with inwardly and radially directed flanges $a^1$ and $b^1$ respectively, and for the purpose of connecting these flanges together one of them, and in the illustrated example the part $b$, carries a number of projections, which may be in the form of pins $d$ which have heads $d^1$ and are fixed in apertures $b^2$ in the inwardly directed flange $b^1$ of the secondary or detachable part $b$ in any suitable manner, as for instance by means of screws $e$, passing through their heads $d^1$. The shanks of the pins are of square or rectangular section, and pass through correspondingly shaped holes $a^2$ in the inwardly directed flange $a^1$ of the main rim part $a$ and are of a length sufficient for the ends thereof to project beyond the inner face of the latter flange as shown in Fig. 5. In each projecting end portion is a transverse key-hole shaped slot or aperture $f$, that runs substantially parallel with the rim seating $a^3$, the wide part of the slot being circular in section and the narrow part, extending from the circular part to the extreme end of the projecting portion, being substantially rectangular, Fig. 6.

The circular part of the key-hole slot $f$ for a portion of its length is cylindrically bored, Figs. 3, 6 and 7, while the remainder is conically formed to constitute a seating for elements referred to below.

For the purpose of locking the projections or pins $d$ in the openings $a^2$ in the inwardly projecting flange $a^1$ of the main rim part I provide a metal ring or circular rod $g$ of suitable material and strength. This ring or rod is disposed between the wheel spokes, which are not shown, and the inner face of the inwardly projecting flange $a^1$ of the main part with limited freedom of movement, and carries a series of lugs $h$, each of which is partly cylindrical and partly tapered and fixed to or formed on the ring $g$. The cylindrical and tapered portions being of a size to coöperate with the cylindrically and conically bored seatings in the key-hole shaped slots $f$.

When the detachable rim part $b$ has been connected with the main part $a$, by passing the projections or pins $d$ through the openings in flange $a^1$, and it is desired to lock the two parts $a$ and $b$ in the adjusted position, the ring $g$ is, if necessary, turned in a circumferential direction until such parts of it as extend between pairs of lugs $h$ are opposite the mouths or ends of the narrow parts of the key-hole slots $f$, these narrow parts being of sufficient size to admit the said ring portions, but not the lugs. The said ring portions are then made to pass through the narrow and into the wider parts of the slots whereupon the ring is turned circumferentially so as to cause the lugs $h$ to enter and seat themselves in the slots $f$, thereby preventing withdrawal of the projections or pins $d$ carried by the detachable rim part $b$ from out of the slots in the flange of the main part $a$.

In order to retain or lock the lugs within the slots of the pins, the tapered portion of one or more lugs may be extended in cylindrical form, as indicated at $h^1$ in Fig. 4, which cylindrical portion is threaded for coöperation with a nut $h^2$ loosely threaded on to the ring. When the nut is applied to a threaded cylindrical extension and turned until it bears firmly against the side of the corresponding pin shank, all the lugs on the ring will be drawn into the seatings in the respective key-hole slots and be there retained.

If found necessary suitable means may be provided on the inner face of the inwardly extending flange $a^1$ of the main part, to guide the ring when turned circumferentially for seating and locking the lugs in the coöperating slots. Such means may, as shown in Fig. 7, consist of pairs of arc shaped ribs $i$ $j$ that are fixed to the flange $a^1$, between each pair of apertures $a^2$, by means of lugs $k$ and screws $l$ or in any other convenient manner. The ribs constituting a pair are spaced apart sufficiently to embrace the ring or rod $g$ on two sides.

Means may be provided for locking the nut or nuts $h^2$ in operative positions, and such means may consist of spring clips $m$, as shown in Fig. 8. The clips would be so formed that they will snap on and off the rod $g$ and bear against the flange $a^1$ when in position on the rod. They would each be arc shaped and of a length corresponding to the circumferential length between the end $h^3$ of the lug $h$, when the nut is screwed home, and the ends of the adjacent guide ribs $i$ $j$ or the end of the next adjacent lug $h$. The clips can be attached by a chain or in any other suitable manner to the part $a$ so that they will not be lost when removed from the rod $g$.

Having thus described the nature of the said invention and the best means I know of carrying the same into practical effect, I claim:—

1. A divisible wheel rim comprising in combination, a pair of rim members capable of being laterally separated and having overlapping inwardly extending flanges, one of said rim members having apertures in its flange, a plurality of coupling pins carried by the flange of the other rim member, and having shank portions arranged to project through the apertures in the flange of the first named rim member, each of said shank portions having an open slot, extending substantially parallel with the wheel rim and of a key-hole shaped cross section, the contracted part of said slot extending to the end of the pin-shank, and the enlarged part being partly cylindrically and partly conically bored to constitute a seating, and a ring shiftable relatively to the rim and provided with a plurality of conically shaped lugs for engagement with the seatings in the said shank portions, said lugs adapted when the ring is shifted in one direction, to move into said seatings to lock the coupling pins collectively in the said apertures at one and the same time and, when the ring is shifted in the reverse direction, to withdraw from the seatings.

2. A divisible wheel rim comprising in combination, a pair of rim members capable of being laterally separated and having overlapping inwardly extending flanges, one of said members having apertures in its flange, a plurality of coupling pins carried by the flange of the other rim member, and having shank portions arranged to project through the apertures in the flange of the first named rim member, said shank portions each having an open end key-hole slot substantially parallel with the wheel rim, the contracted part of said slot extending to the end of the pin shank, and the enlarged part being partly cylindrically and partly conically bored to constitute a seating, a ring shiftable relatively to the rim and provided with a plurality of conically shaped lugs for engagement with the seatings in the said shank portions, said lugs adapted, when the ring is shifted in one direction, to move into the seatings to lock the coupling pins collectively in the said holes at one and the same time, and when the ring is shifted in the reverse direction, to withdraw from said seatings, and adjustable means carried by the ring and bearing against a side of one of said pins for drawing all the lugs on the ring simultaneously into the seatings in the pins and retaining them therein.

3. A divisible wheel rim comprising in combination, a pair of rim members capable of being laterally separated and having overlapping inwardly extending flanges, one of said rim members having a plurality of apertures in its flange, a plurality of coupling pins carried by the flange of the other rim member, and having shank portions arranged to project through the apertures in the flange of the first named rim member, said shank portions each having an open key-hole slot substantially parallel with the wheel rim, the contracted part of said slot extending to the end of the pin shank, and the enlarged part being partly cylindrically and partly conically bored to constitute a seating, a ring shiftable relatively to said rim and provided with a plurality of conically shaped lugs for engagement with the seatings in the shank portions of said pins, said lugs adapted, when the ring is shifted in one direction, to move into the seatings of said pins to lock the latter collectively in the said holes at one and the same time and, when the ring is shifted in the reverse direction, to withdraw from the seatings, and adjustable means carried by the ring and bearing against a side of one of said pins to draw all the lugs on the ring simultaneously into the seatings in the pins and retain them therein, and means comprising a spring clip engageable with the ring for locking said drawing and retaining means in an adjusted position.

In testimony whereof I have signed my name to this specification in the presence of two subscribing witnesses.

JOHN CHARLES BARKER.

Witnesses:
WALTER J. S. MERTEN,
H. C. CARPENTER.